United States Patent [19]
Cheney et al.

[11] Patent Number: 5,777,679
[45] Date of Patent: Jul. 7, 1998

[54] VIDEO DECODER INCLUDING POLYPHASE FIR HORIZONTAL FILTER

[75] Inventors: Dennis Phillip Cheney, Vestal; David Allen Hrusecky, Johnson City, both of N.Y.; Mihailo M. Stojancic, Sunnyvale, Calif.

[73] Assignee: International Business Machines Corporation, Armonk, N.Y.

[21] Appl. No.: 616,327

[22] Filed: Mar. 15, 1996

[51] Int. Cl.$^6$ ........................................... H04N 7/12
[52] U.S. Cl. ........................ 348/401; 364/715.02
[58] Field of Search ........................ 348/401, 391, 348/392, 394, 395, 396, 398, 399, 400, 402, 408, 420, 423, 424, 425, 440, 445, 458, 459, 427; 364/715.02; H04N 7/12

[56] References Cited

U.S. PATENT DOCUMENTS

| | | | |
|---|---|---|---|
| 4,918,524 | 4/1990 | Ansari et al. | 358/133 |
| 5,122,788 | 6/1992 | Sid-Ahmed et al. | 340/720 |
| 5,128,633 | 7/1992 | Martin et al. | 331/2 |
| 5,128,791 | 7/1992 | LeGall et al. | 358/141 |
| 5,168,456 | 12/1992 | Hyatt | 364/728.03 |
| 5,220,413 | 6/1993 | Jeong | 358/31 |
| 5,253,059 | 10/1993 | Ansari et al. | 348/390 |
| 5,268,751 | 12/1993 | Geiger et al. | 358/12 |
| 5,274,372 | 12/1993 | Luthra et al. | 341/61 |
| 5,325,125 | 6/1994 | Naimpally et al. | 348/402 |
| 5,422,827 | 6/1995 | Niehaus | 364/514 R |
| 5,436,665 | 7/1995 | Ueno et al. | 348/412 |
| 5,485,215 | 1/1996 | Meyer et al. | 348/423 |
| 5,523,850 | 6/1996 | Kanda et al. | 348/392 |

*Primary Examiner*—Amelia Au
*Assistant Examiner*—Y. Lee
*Attorney, Agent, or Firm*—Richard M. Goldman

[57] ABSTRACT

A digital signal decoder system for receiving compressed encoded digitized video signals and transmitting decompressed decoded digital video signals with accurate expansion for various aspect ratios. This is accomplished through convolution multiplication carried out in 4-tuple parallel with 4-2 counters through a folding serial adder which creates a convolution sum of pixels of the motion compensated data stream to thereby expand the output video display to the desired aspect ratio.

4 Claims, 19 Drawing Sheets

DISCRETE COSINE TRANSFORM
$$y_{kl} = \frac{c(k)c(l)}{4} \sum_{i=0}^{\frac{n}{2}} \sum_{j=0}^{\frac{n}{2}} x_{ij} \cos\left(\frac{(2i+1)k\pi}{16}\right) \cos\left(\frac{(2j+1)l\pi}{16}\right)$$
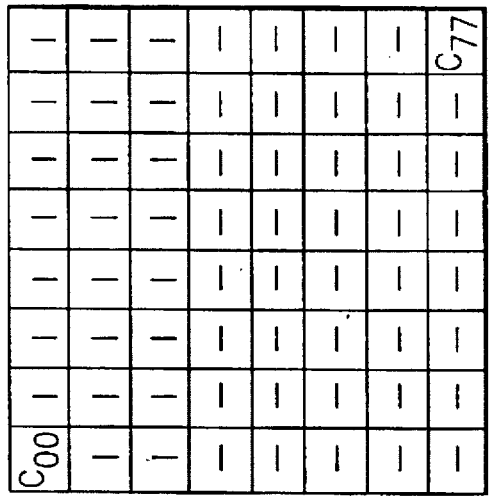
COEFFICIENTS
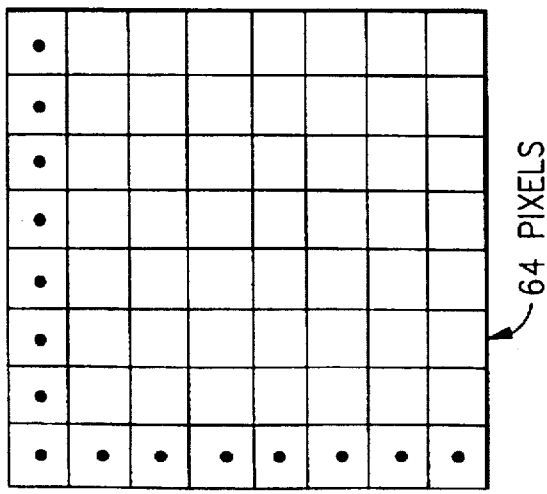
64 PIXELS
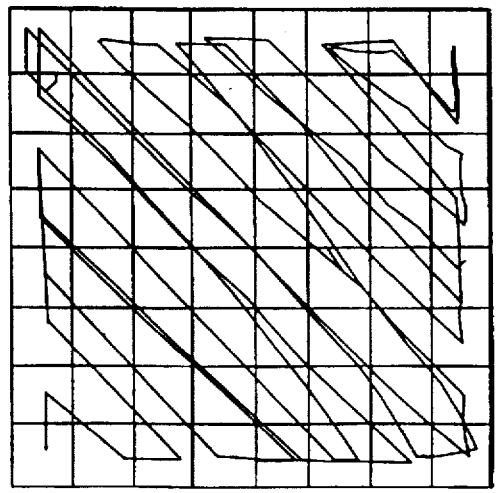
QUANTIZE, "ZIG ZAG"
0001101011011 QUANTIZED, ZIG ZAGGED COEFFICIENT LOST SYSTEM
PRIOR ART
FIG. 2

```
X X X X X X X X X X X X
 O   O   O   O   O   O   O
X X X X X X X X X X X X

X X X X X X X X X X X X
 O   O   O   O   O   O   O
X X X X X X X X X X X X
```
X REPRESENTS LUMINANCE SAMPLES
O REPRESENTS CHROMINANCE SAMPLES

X X X X X X X X X X X X
 O   O   O   O   O   O   O
X X X X X X X X X X X X
 O   O   O   O   O   O   O
```
X REPRESENTS LUMINANCE SAMPLES
O REPRESENTS CHROMINANCE SAMPLES

FIG.9

```
X X X X X X X X X X X
 O   O   O   O   O   O
```
X REPRESENTS LUMINANCE SAMPLES
O REPRESENTS CHROMINANCE SAMPLES

FIG.10

```
X X X X X X X X X X X
  O   O   O   O   O   O
```
X REPRESENTS LUMINANCE SAMPLES
O REPRESENTS CHROMINANCE SAMPLES

|  | y0<br>O0 | y1 | y2<br>O1 | y3 | y4<br>O2 | y5 | y6<br>O3 | y7 | y8<br>O4 |
|---|---|---|---|---|---|---|---|---|---|

PROGRESSION OF y(n) PHASES →

| ORIGINAL DATA (Y) | ORIGINAL DATA (UV) | STARTING Y-PHASE | Y-PEL OFFSET |
|---|---|---|---|
| 0 | | 0 | 0.00 |
| 3 | | 3 | 0.25 |
| 2 | | 2 | 0.50 |
| 1 | | 1 | 0.75 |
| 0 | | 0 | 1.00 |
| 3 | | 3 | 1.25 |
| 2 | | 2 | 1.50 |
| 1 | | 1 | 1.75 |
| 0 | | 0 | 0.00 |

Phase progression grid:

```
0  1  2  3  0  1  2  3  0
.3 0  1  2  3  0  1  2  3
.2 3  0  1  2  3  0  1  2
.1 2  3  0  1  2  3  0  1
.0 1  2  3  0  1  2  3  0
.3 0  1  2  3  0  1  2  3
.2 3  0  1  2  3  0  1  2
.1 2  3  0  1  2  3  0  1
.0 1  2  3  0  1  2  3  0
```

ORIGINAL Y DATA: y0  y1  y2  y3  y4  y5  y6  y7  y8

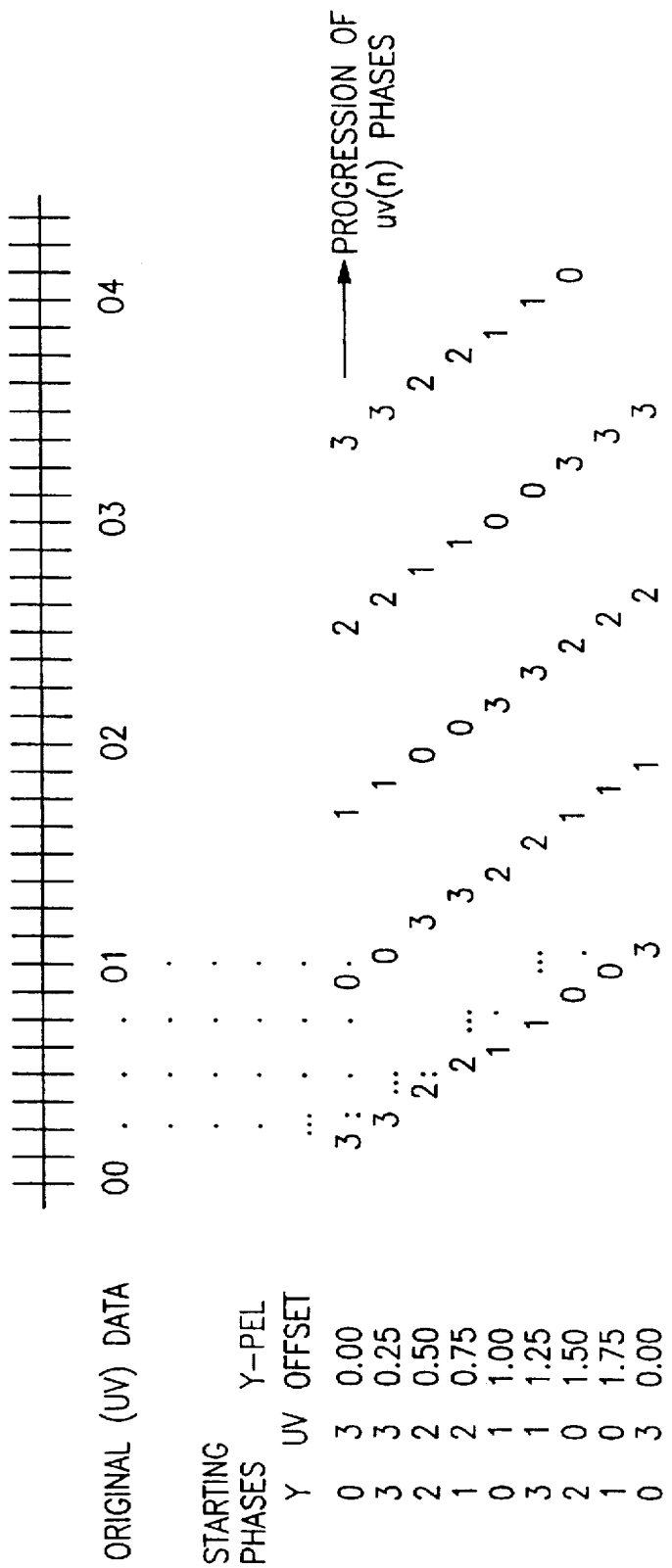
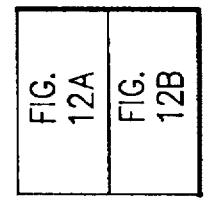
FIG.12B
FIG.12

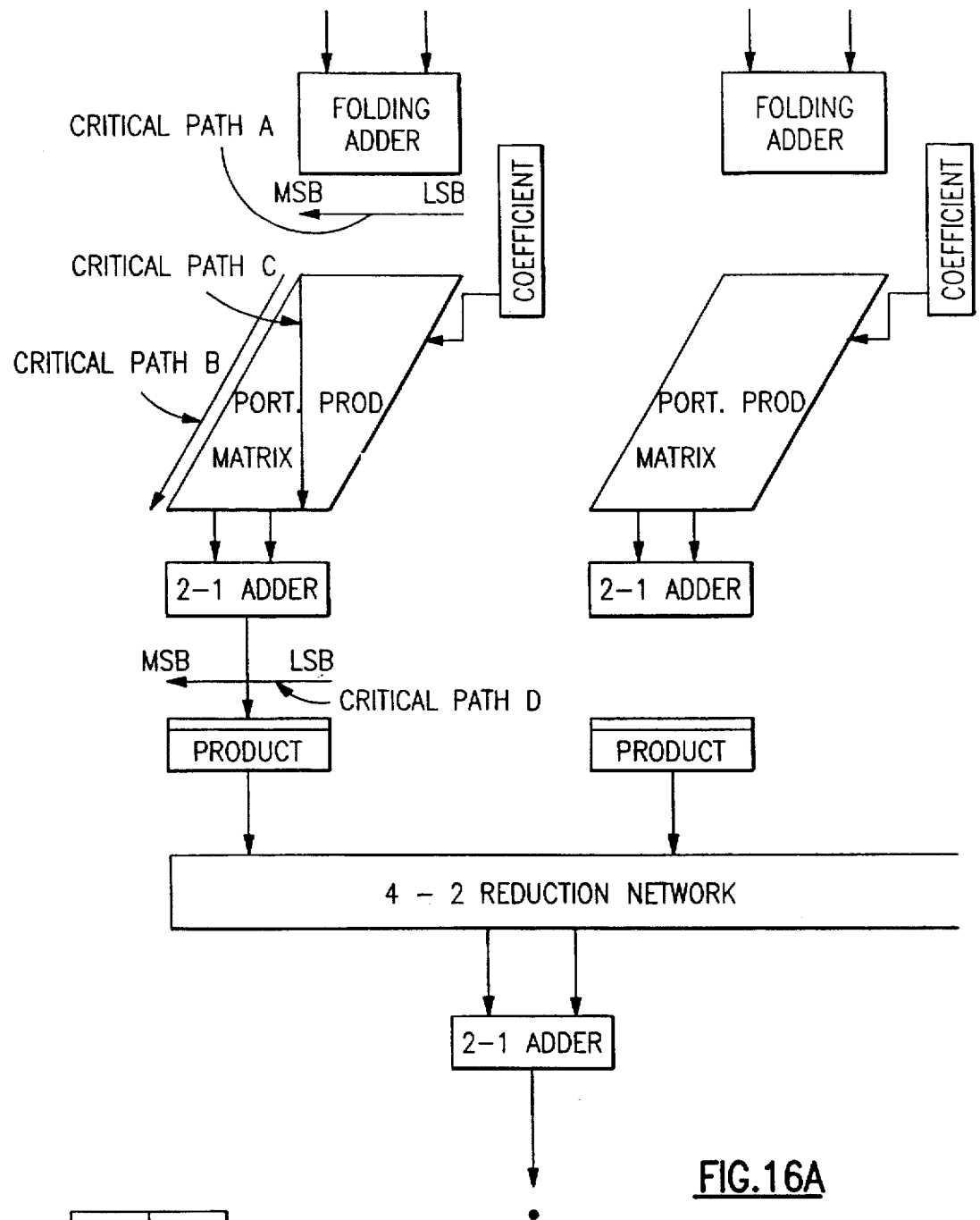
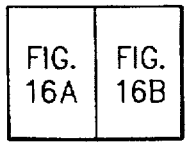
FIG.16A
FIG.16

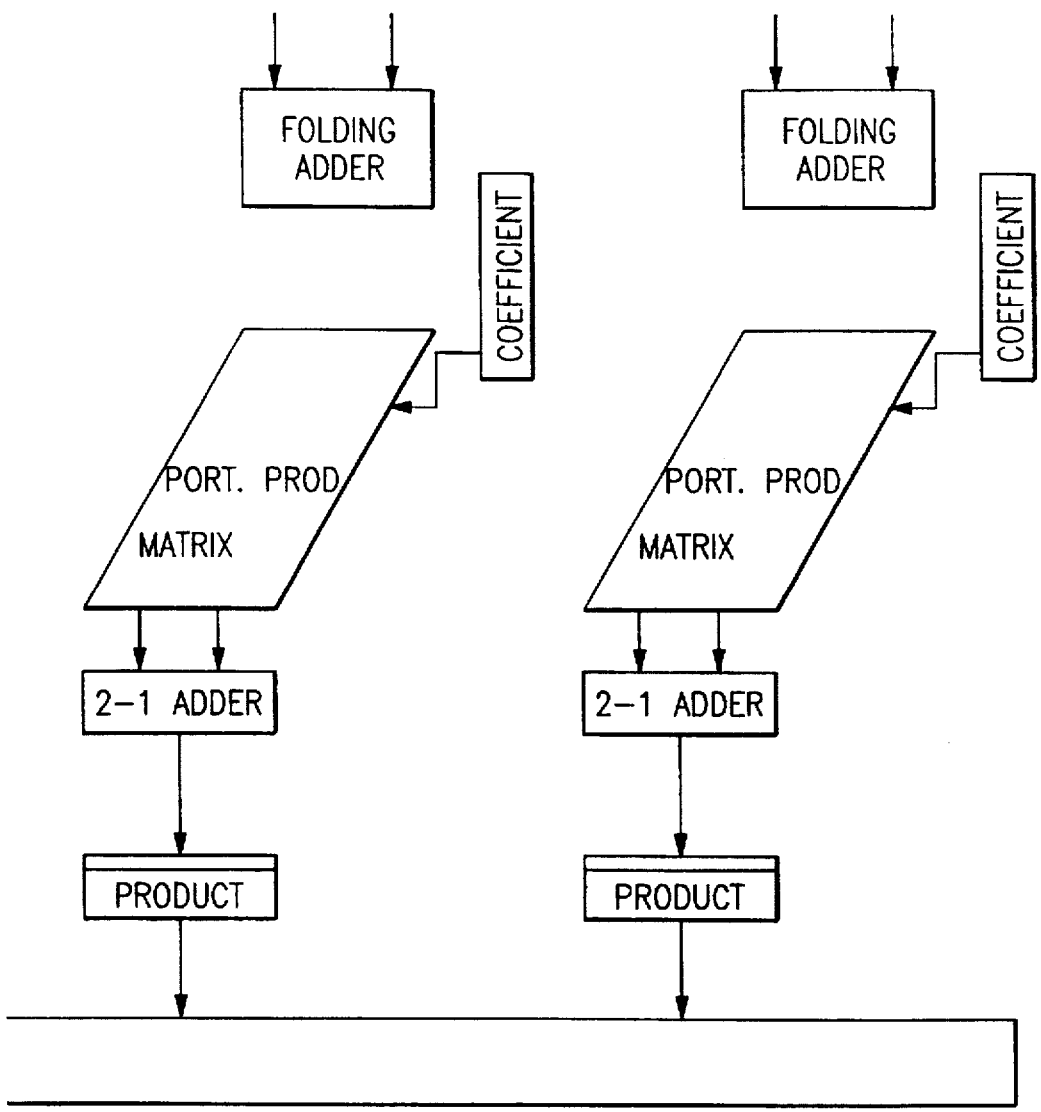
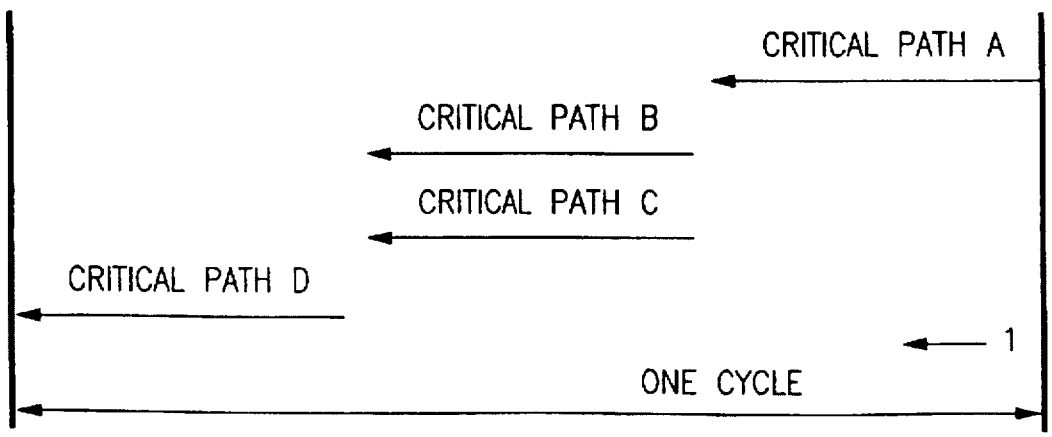
FIG.16B

VIDEO DECODER INCLUDING POLYPHASE FIR HORIZONTAL FILTER

FIELD OF THE INVENTION

This invention relates to video decoders, especially video decoders intended to decode and decompress compressed encoded video data streams, e.g., discrete cosine transform encoded video data streams. The method and apparatus of the invention are particularly useful in resizing output images for different output display aspect ratios. The method, apparatus, and system of the invention are useful in decoding broadcast signals, cablecast signals, satellite broadcast signals, and digital network signals, as well as in high definition television, interactive television, multimedia, video on demand, video conferencing, and digital video recording. The system and apparatus of the invention may be a "stand alone" unit, as a set top box or a digital entertainment terminal, or the like, as a component of a television set, a personal computer, work station, or other computer, as a unit contained on one or more printed circuit boards, or as part of a video recorder or dedicated teleconferencing unit.

BACKGROUND OF THE INVENTION

The Moving Picture Experts' Group (MPEG) MPEG-2 Standard is a compression/decompression standard for video applications. The standard describes (1) an encoded and compressed datastream that has substantial bandwidth reduction, and (2) the decompression of that datastream. The compression is a subjective loss compression followed by a lossless compression. The encoded, compressed digital video data is subsequently decompressed and decoded in an MPEG-2 Standard compliant decoder, that is, an MPEG-2 compliant decoder.

The MPEG-2 Standard is described in, e.g., C. A. Gonzales and E. Viscito, "Motion Video Adaptive Quantization In The Transform Domain," IEEE Trans Circuits Syst Video Technol, Volume 1, No. 4, Dec. 1991, pp. 374–378, E. Viscito and C. A. Gonzales, "Encoding of Motion Video Sequences for the MPEG Environment Using Arithmetic Coding," SPIE, Vol. 1360, pp. 1572–1576, (1990), D. LeGall, "MPEG: A Video Compression Standard for Multimedia Applications," Communications of the ACM, Vol. 34, No. 4, (April 1991), pp. 46–58, S. Purcell and D. Galbi, "C Cube MPEG Video Processor," SPIE, v. 1659, (1992) pp. 24–29, and D. J. LeGall, "MPEG Video Compression Algorithm," Signal Process Image Commun, v. 4, n. 2, (1992), pp. 129–140, among others.

The MPEG-2 Standard specifies a datastream from and a decoder for a very high compression technique that achieves overall image datastream compression not achievable with either intraframe coding alone or interframe coding alone, while preserving the random access advantages of pure intraframe coding. The combination of block based frequency domain intraframe encoding and interpolative/ predictive interframe encoding of the MPEG-2 Standard result in a balance between intraframe encoding alone and interframe encoding alone.

The MPEG-2 Standard exploits temporal redundancy for motion compensated interpolative and predictive encoding. That is, the assumption is made that "locally" the current picture can be modeled as a translation of the picture at a previous and/or future time. "Locally" means that the amplitude and direction of the displacement are not the same everywhere in the picture.

The MPEG-2 Standard specifies predictive and interpolative interframe encoding and frequency domain intraframe encoding. It has block based motion compensation for the reduction of temporal redundancy, and block based Discrete Cosine Transform based compression for the reduction of spatial redundancy. Under MPEG-2 Standard motion compensation is achieved by predictive coding, interpolative coding, and Variable Length Coded motion vectors. The information relative to motion is based on a 16×16 array of pixels and is transmitted with the spatial information. Motion information is compressed with Variable Length Codes, such as Huffman codes.

The MPEG-2 Standard provides temporal redundancy reduction through the use of various predictive and interpolative tools. This is illustrated in FIG. 1. FIG. 1 shows three types of frames or pictures, "I" Intrapictures, "P" Predicted Pictures, and "B" Bidirectional Interpolated Pictures. Note that for interframe encoding, as IP and IPB encoding, picture transmission order is not the same as picture display order. This is shown with particularity in FIG. 1.

Motion compensation goes to the redundancy between pictures. The formation of "P" Predicted Pictures from "I" Intrapictures and of "B" Bidirectional Coded Pictures from a pair of past and future pictures is a key feature of the MPEG-2 Standard technique.

The "I" Intrapictures provide moderate compression, and are access points for random access, e.g., in the case of video tapes or CD ROMS. As a matter of convenience, one "I" Intrapicture is provided approximately every half second that is, every ten to twenty pictures. The "I" Intrapicture only gets information from itself. It does not receive information from a "P" Predicted Picture or "B" Bidirectional Interpolated Picture. Scene cuts preferably occur at "I" Intrapictures.

"P" Predicted Pictures are coded with respect to a previous picture. "P" Predicted Pictures are used as the reference for future pictures, both "P" and "B" pictures.

"B" Bidirectional Coded pictures have the highest degree of compression. They require both a past picture and a future picture for reconstruction. "B" bidirectional pictures are never used as a reference.

The motion compensation unit under the MPEG-2 Standard is the Macroblock unit. The MPEG-2 Standard Macroblocks are 16×16 pixels. Motion information consists of one vector for forward predicted macroblocks, one vector for backward predicted macroblocks, and two vectors for bidirectionally predicted macroblocks. The motion information associated with each macroblock is coded differentially with respect to the motion information present in the reference macroblock. In this way a macroblock of pixels is predicted by a translation of a macroblock of pixels from a past or future picture.

The difference between the source pixels and the predicted pixels is included in the corresponding bit stream. The decoder adds a correction term to the block of predicted pixels to produce the reconstructed block.

As described above and illustrated in FIG. 1, each macroblock of a "P" Predicted Picture can be coded with respect to the closest previous "I" Intrapicture, or with respect to the closest previous "P" Predicted Picture.

Further, as described above and illustrated in FIG. 1, each macroblock of a "B" Bidirectional Picture can be coded by forward prediction from the closest past "I" or "P" Picture, by backward prediction from the closest future "I" or "P" Picture, or bidirectionally, using both the closest past "I" or "P" picture and the closest future "I" or "P" picture. Full bidirectional prediction is the least noisy prediction.

Motion information is sent with each macroblock to show what part of the reference picture is to be used as a predictor.

As noted above, motion vectors are coded differentially with respect to motion vectors of the previous adjacent block. Variable Length Coding is used to code the differential motion vector so that only a small number of bits are needed to code the motion vector in the common case, where the motion vector for a macroblock is nearly equal to the motion vector for a preceding macroblock.

Spatial redundancy is the redundancy within a picture. Because of the macroblock based nature of the motion compensation process, described above, it was desirable for the MPEG-2 Standard to use a block based method of reducing spatial redundancy. The method of choice is the Discrete Cosine Transformation, and Discrete Cosine Transform coding of the picture. Discrete Cosine Transform coding is combined with weighted scalar quantization and run length coding to achieve still further levels of compression.

The Discrete Cosine Transformation is an orthogonal transformation. Orthogonal transformations, because they have a frequency domain interpretation, are filter bank oriented. The Discrete Cosine Transformation is also localized. That is, the encoding process samples on an 8×8 spatial window which is sufficient to compute 64 transform coefficients or sub-bands.

Another advantage of the Discrete Cosine Transformation is that fast encoding and decoding algorithms are available. Additionally, the sub-band decomposition of the Discrete Cosine Transformation is sufficiently well behaved to allow effective use of psychovisual criteria.

After Discrete Cosine transformation, many of the higher frequency coefficients are zero. These coefficients are organized into a zig-zag, as shown in FIG. 2, and converted into run-amplitude (run-level) pairs. Each pair indicates the number of zero coefficients and the amplitude of the non-zero coefficient. This is coded in a Variable Length Code.

Discrete Cosine Transformation encoding is carried out in the three stages as shown in FIG. 2. The first stage is the computation of the Discrete Cosine Transformation coefficients. The second step is the quantization of the coefficients. The third step is the conversion of the quantized transform coefficients into {run-amplitude} pairs after reorganization of the data into zig-zag scanning order.

Quantization can be viewed as a shift right by one or more bits. Quantization enables very high degrees of compression, and a high output bit rate, and retains high picture quality.

Quantization can be adaptive, with "I" Intrapictures having fine quantization to avoid "blockiness" in the reconstructed image. This is important because "I" Intrapictures contain energy at all frequencies. By way of contrast, "P" and "B" pictures contain predominantly low frequency energy and can be coded at a coarser quantization.

One challenge facing decoder designers is the accommodation of a single decoder system to a variety of display output formats, while complying fully with luminance/chrominance relationships and the MPEG2 standard.

MPEG 2 Video decoder/display functions are required to transform the presentation aspect ratio of the decoded source video stream to fit the needs of the environment to which the decoder/display function is installed.

The displayed output of the decoder chip must conform to CCIR recommendation 601. This specifies the number of luminance and chrominance pixels in a single active line, and also how the chrominance pixels are subsampled relative to the luminance signals. The format defined as 4:2:2 is supported in most cases in the industry. This defines 720 active luminance signals (Y), and 360 color difference signals (Cb, Cr pairs), where each line of luminance signals has corresponding line of chrominance signals. CCIR recommendation 656 goes on to define the number of active lines for NTSC and PAL environments as 480 and 576, respectively.

Decoded images may not conform to the full sized CCIR-601 resolution. For example, the input video may be formatted for 352 vertical columns of pixels, but these may need to be expanded to fill a 704 vertical column space on a video display (CRT). This is known as 1 to 2 expansion (1:2) because of the doubling of horizontally displayable pixels. This can be done by any of several methods well known to the art, including pixel repetition (repeating every pixel horizontally once), or averaging of adjacent pixels to produce new pixel to be placed in between them.

OBJECTS OF THE INVENTION

It is one objective of the invention to provide a system that maintains and even increases the speed of the decoding process.

It is another objective of the invention to provide an MPEG2 compliant decoder that can be utilized with many output display formats, that is, aspect ratios, while fully complying with luminance/chrominance standards and the MPEG2 standard.

It is yet another objective of the invention to reduce the latency of the filter network in order to reduce the need for larger numbers of pipeline registers, and achieve an overall compactness.

SUMMARY OF THE INVENTION

These and other objectives of the invention are attained by the digital video signal decoder system of the invention. The system is useful for receiving encoded compressed digital video signals from a network or host and transmitting decoded digital video signals to an output display. The elements of the decoder system include a FIFO data buffer, a variable length code decoder, a dequantizer, a discrete cosine transform invertor, a motion compensator, a polyphase finite impulse response horizontal filter for display output processing, a display unit video output, and a controller.

More complex methods of aspect ratio expansion to tailor the aspect ratio of the display output to the aspect ratio of the display device involve use of a Finite Impulse Response (FIR) transfer function to create a convolution sum, and thus, a new pixel is interpolated from the analysis of several input pixels. This method is preferred when greater accuracy is desired is the resulting expanded video display, and this is an embodiment of the invention.

While still a FIR filter method for horizontal expansion, the display function may be required to perform several different aspect ratio transformations. Aspect ratios such as 1:2, 3:4, and 2:3, among others, are common in the industry. Since video display functions are very cost sensitive, it is desirable to design the horizontal expansion function to perform all of the required aspect ratio transformations with the same digital circuitry. This multiplexing of the digital circuitry is advantageous to reduce the amount of area required to implement the display function, because area, especially in VLSI implementations, is an important factor in determining the manufacturing cost of the decoder/display function. Recently, the inclusion of several different aspect ratio transformations into a single display function has become common, and as such, it is beneficial to pursue methods which reduce the silicon area required for this capability.

The FIR method is realized by a convolution sum, where each output pixel is the summation of individual multiplication products of input data (digital pixel value ) and a predetermined impulse response coefficient (appropriate to the type of horizontal expansion desired). These coefficients in some cases are selected to be symmetric in order to reduce the number of multiplications required in the implementations. Also the remaining multiplications that must be performed in parallel to produce a single convoluted result are combined in such a way to reduce the area of the circuitry. One part of the invention lies in this combination of multiplications.

When the original image is decoded, the chrominance may be sub-sampled in several ways, two of which include simple decimation and another by means of a digital filter. This implies a certain spatial locality of the chrominance samples with respect to the luminance samples. When this image is post-processed by the display function during certain expansions, this spatial relationship must be reconstructed as closely as possible, otherwise distortion can result in the form of a color shift. This is especially important for the MPEG-2 Pan/Scan feature, which requires sub-pixel accuracy. Another part of the invention lies in a display function such that more accurate chrominance can be produced from the horizontal expansion display function, while not allowing the circuitry for this increased accuracy to be a burden to the rest of the design.

THE FIGURES

The invention may be further understood by reference to the Figures appended hereto.

FIG. 2 shows the sequence of compressing a frame or picture, including calculating the Discrete Cosine Transform coefficients, contusing the Discrete Cosine Transform coefficients, and "zig-zagging" the quantized Discrete Cosine Transform coefficients.

FIG. 8 shows the position of luminance and chrominance signals in a 4:2:0 format.

FIG. 9 shows the position of luminance and chrominance signals in a 4:2:2 format.

FIG. 10 shows the horizontal position of MPEG2 chrominance signals.

FIG. 11 shows the horizontal position of MPEG1 chrominance signals.

FIG. 12 shows the luminance and chrominance phase relationships for 3:4 expansion.

FIG. 16 shows a folding adder feeding a multiplicand port.

DETAILED DESCRIPTION OF THE INVENTION

The systems, method, and apparatus of the invention receive encoded, compressed digital video data from a host interface bus, decompress and decode the digital video data, and deliver decompressed, decoded digital video data through a display interface, also referred to herein as a pixel bus and an aspect ratio conversion means, as a poly-phase finite impulse response filter, to a display output. Conversion from digital data to analog data is done externally of the system, although in one embodiment, a digital to analog converter (DAC) can be incorporated into the system downstream of the pixel bus.

In a preferred embodiment of the invention the decoder system complies fully with the Moving Picture Experts Group MPEG-2 Standard Main Profile at the Main Level, as defined in the MPEG documentation. Thus, the system can receive compressed video data at a rate of 15 Mbs/second, and the system can operate at a 40 MHz clock frequency. In the MPEG-2 Standard the data format for the compressed, encoded data is YCbCr (4:2:0).

Figure 1:
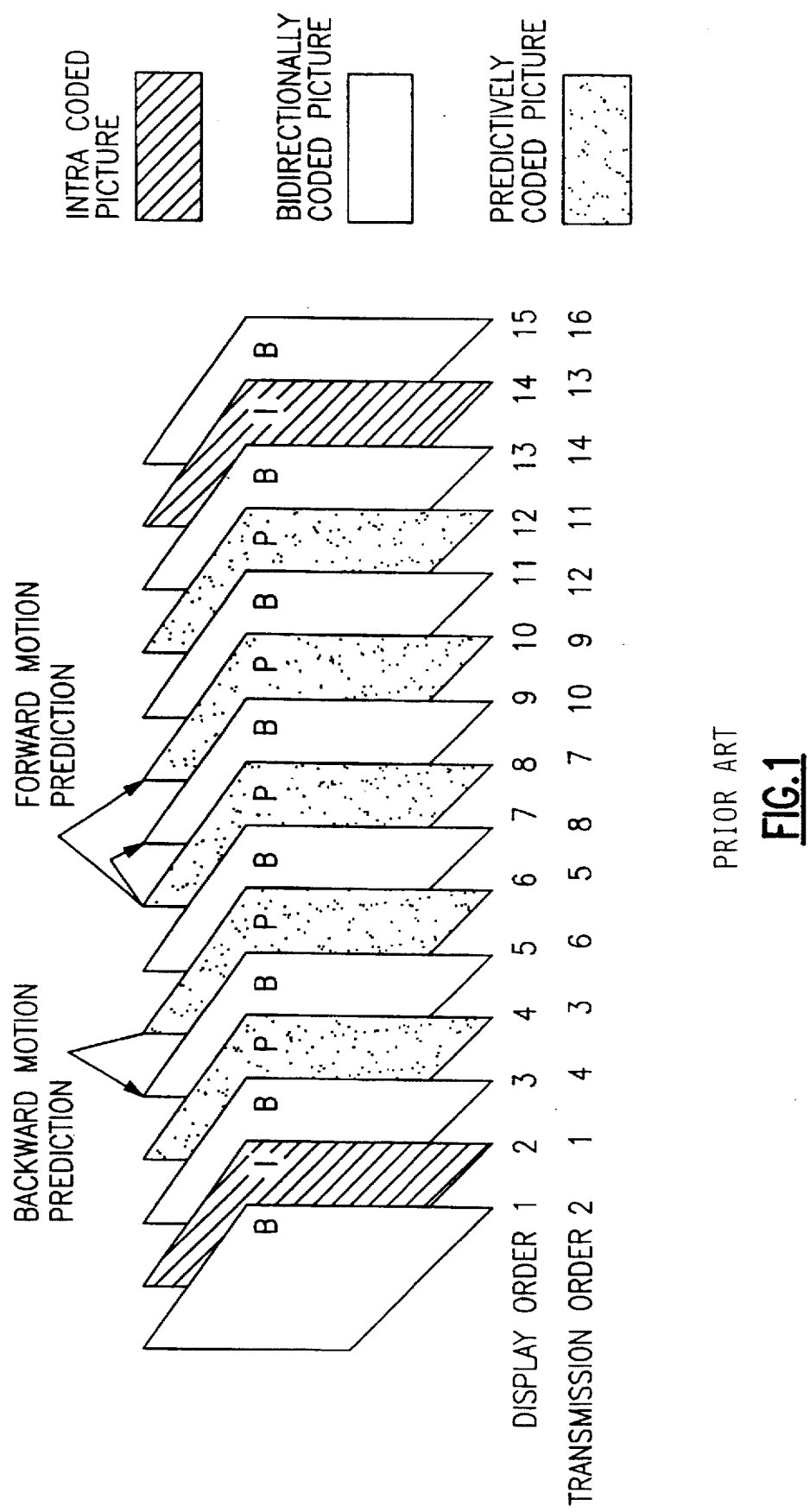
FIG. 1 shows the three type of pictures and their relationship under the MPEG-2 Standard, i.e., "I" Intrapictures, "P" Predicted Pictures, and "B" Bidirectionally Predicted Pictures.
Figure 3:
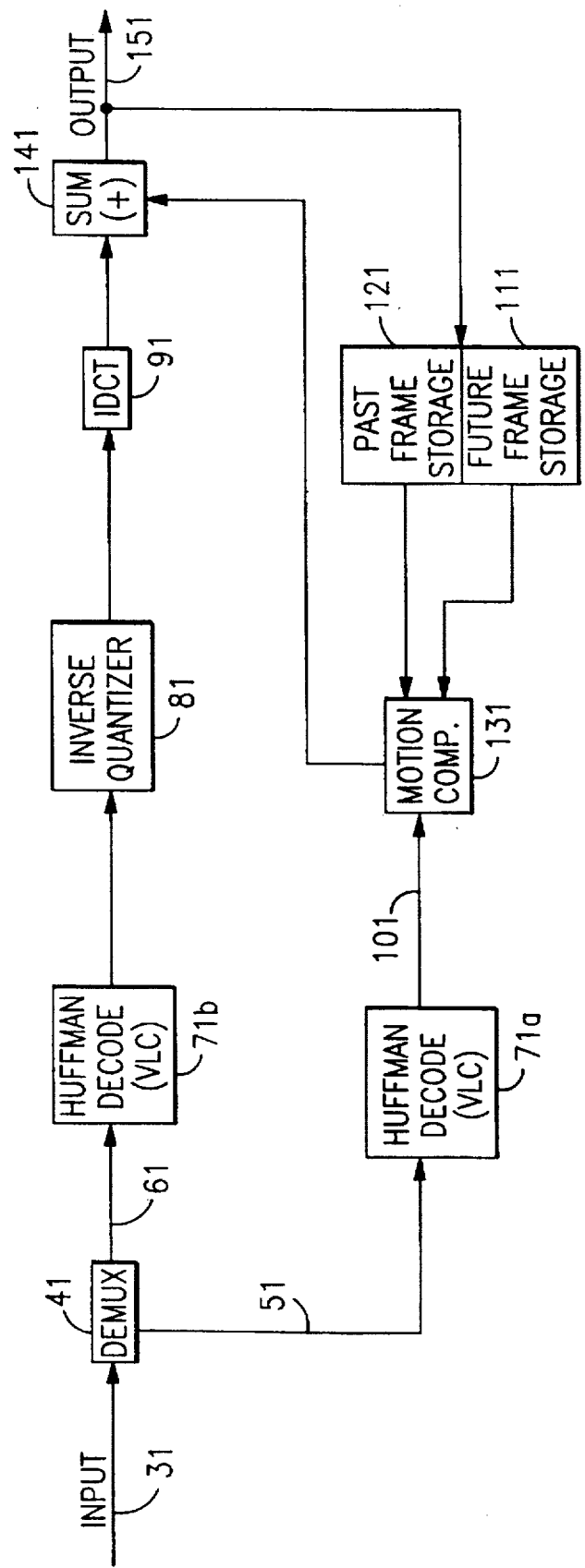
FIG. 3 is a logical flow diagram showing the general logical flow of the MPEG-2 Standard compliant decoder.

FIG. 3 shows the general internal data flow of the system to support the MPEG-2 Standard. Specifically, the compressed, encoded data input 31 goes to a demultiplexer 41 where it is demultiplexed into two streams 51 and 61. Stream 61 goes to a Variable Length Code (VLC) Huffman Decoder 71b for decoding, and to an Inverse Quantizer 81 for dequantizing. The dequantized code then goes to an Inverse Discrete Cosine Transform (IDCT) process 91, where the dequantized code is transformed into a pixel mapping.

The second data stream 51 also goes through a Variable Length Code (VLC) Huffman Decoder 71a where it is decoded into motion vectors 101 which go to a Motion Compensator 131. The Huffman Decoders 71a and 71b are shown as logically separate and distinct, although structurally and electronically they may be the same element.

The Motion Compensator 131 also receives a data stream derived from the first data stream 61 and the motion compensated data stream, summed in Summer 141. The output 151 of the Summer 141 goes to the pixel bus (not shown) and to storage, i.e., Future Frame Storage 111 and Past Frame Storage 121. The contents of the Future Frame Storage 111 and Past Frame Storage 121 are, as appropriate, inputs to the Motion Compensator 131.

Figure 4:
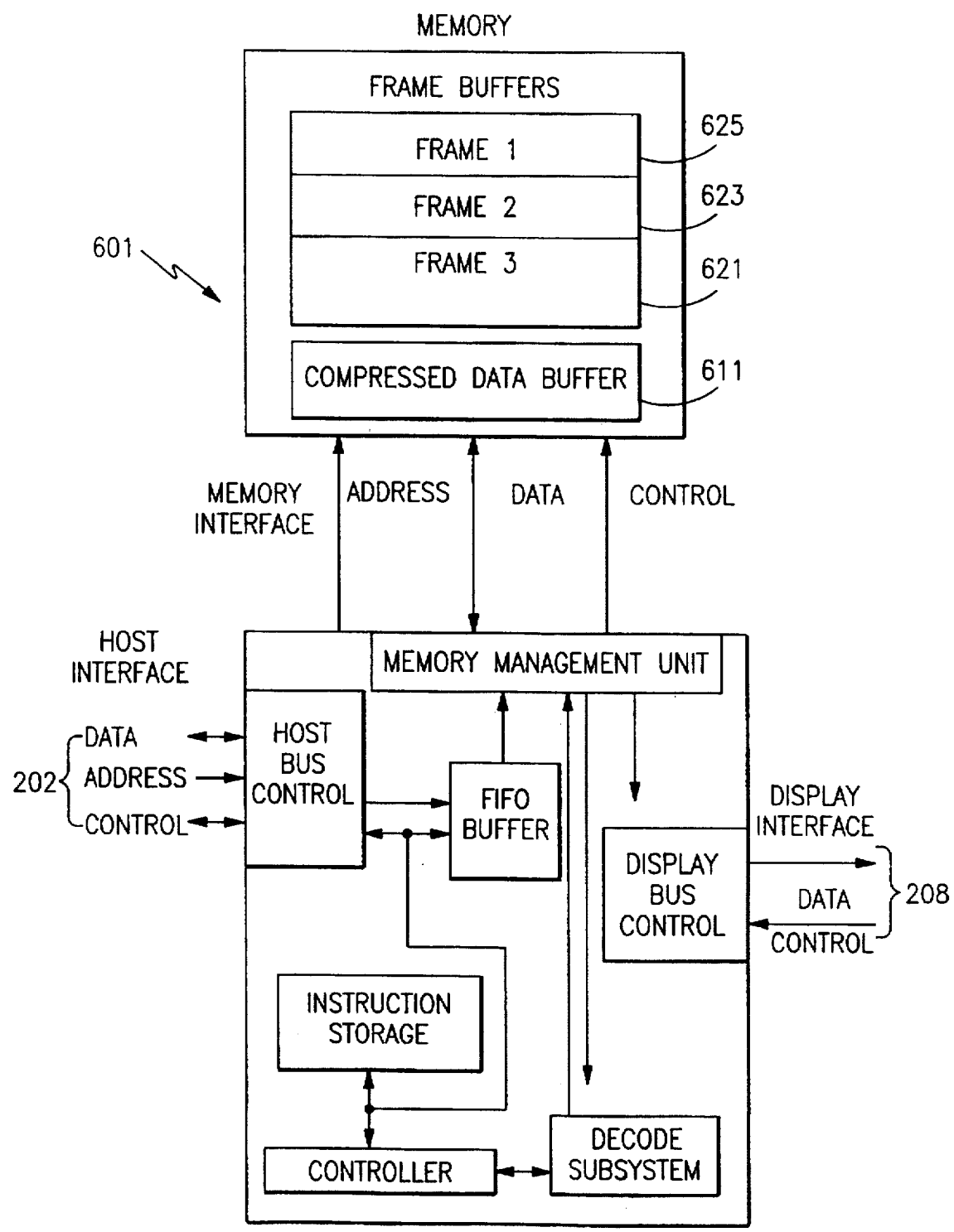
FIG. 4 is a block diagram of the functional units of the MPEG-2 Standard compliant decoder of the invention.

FIG. 4 shows the block diagram of the decoder system 201 of the invention. The system I/O includes three busses from the host interface 202 and two busses to the display interface 208. The buses from the host interface 202 include the data bus 203, the address bus, 205, and the control bus, 207. The data bus 203 may be a 16 bit or a 32 bit bus, or of some other width, or it may be serial, and it may be bidirectional or unidirectional. The address bus 205 is a 6 bit bus, although other widths may be accommodated without departing from the invention. The control bus 207 is a 7 bit bus, although other widths may be accommodated without departing from the invention.

The display interface 208 busses are the data bus 209 and the control bus 211. The data bus 209 is for pixel data. The control bus 211 is for synchronization and control.

The system includes a host bus control element 231, a FIFO buffer 241, a decode subsystem 301, a controller 401, an instruction storage unit 402, a display bus control 501, and a Memory Management Unit 600.

The memory, an external memory 601, includes a Compressed Data Buffer 611 for receiving data from the host interface 202 via the FIFO buffer 241, and frame buffers 621, 623, and 625, for receiving and storing decoded frames, including future frames and past frames.

The interface between the memory management unit 600 and the memory 601 includes an address bus, 221, a bidirectional data bus, 223, and a control bus 225.

Figure 5:
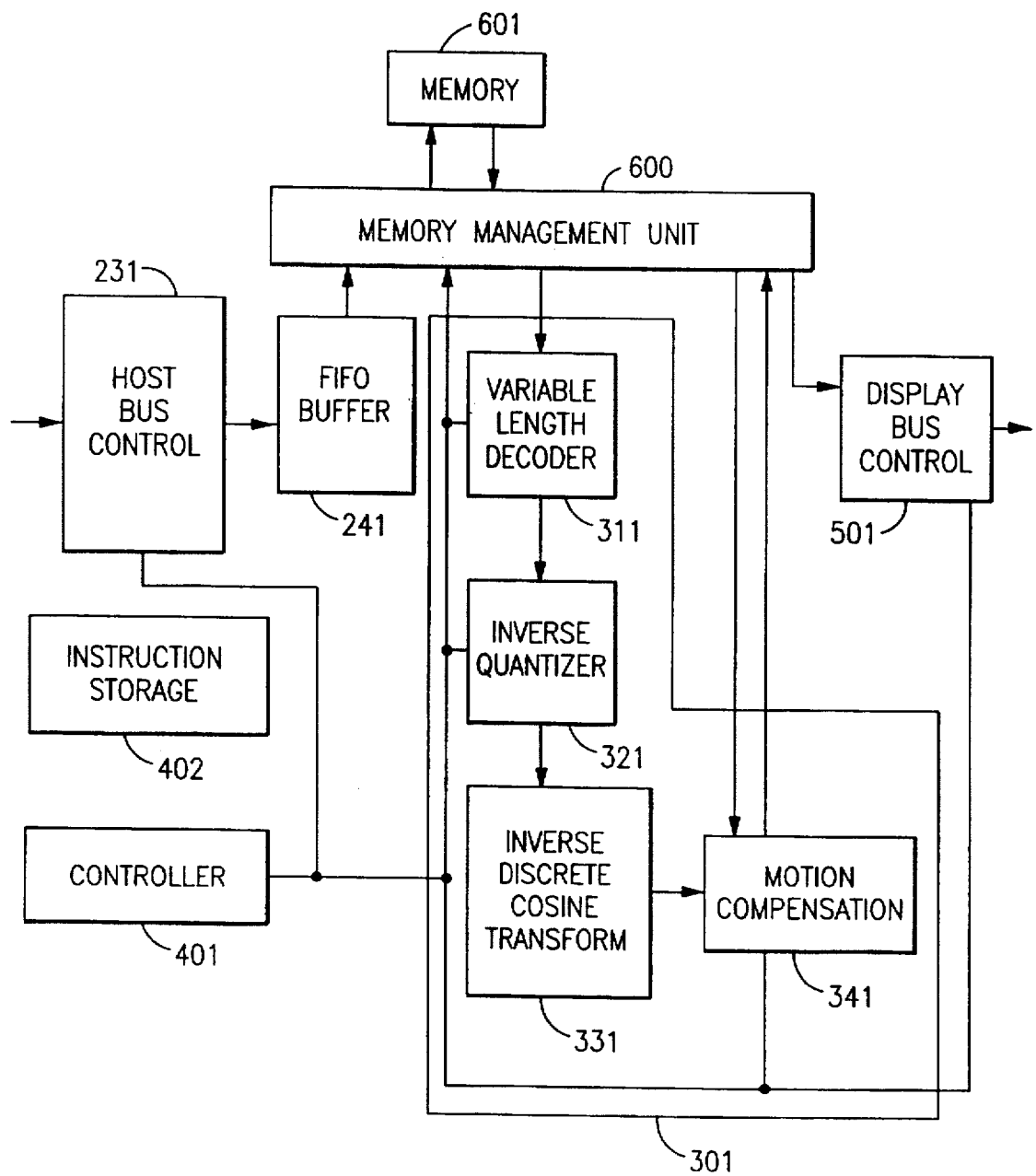
FIG. 5 is a block diagram of the decode subsystem of the MPEG-2 Standard compliant decoder of the invention.

The decode unit 301, shown with detail in FIG. 5, consists of functional units that operate under the control of the controller 401 and its associated Instruction Storage Unit 402. These decode functional units include the Variable Length Code Huffman Decoder 311, the Inverse Quantizer or Dequantizer, 321, the Inverse Discrete Cosine Transform unit, 331, and the Motion Compensation Unit, 341.

The controller 401 is the central point of control for the decoder. The controller 401 microcode is stored in an Instruction Storage unit 402. The controller 401 interacts with the host system through an external processor through the host or system bus for high level commands and status. The controller 401 is responsible for the control and command of the other functional elements, as well as providing global synchronization of these units.

The controller 401 is coupled to the Variable Length Code Huffman Decoder 311. This enables parsing of the code stream. Parsing of the code streams and processing of header information is done by the controller 401 interacting with the VLC Huffman Decoder 311.

The Variable Length Code Huffman Decoder 311 (VLC) contains tables for decoding the data stream and a local state machine that controls the decoding of run/level data for macroblocks. The VLC 311 is controlled by the controller 401 as header information and block run/level symbols are passed from the compressed bit stream. A local state machine decodes the run/level symbols and interacts with the Inverse Quantizer 321 to process the decoded signals.

To be noted is that variable length coding, e.g., Huffman coding, is a statistical coding technique that assigns codewords to symbols. Symbols with a high probability of occurrence are assigned short codewords, while symbols with a low probability of occurrence are assigned longer codewords.

The codes used in the MPEG-2 VLC decoder are taken from the MPEG-2 Standard. The codes form a class of codes known as prefix codes. In a prefix code system, no valid code is a prefix of another code. The number of bits assigned to each codeword is variable, from a minimum of 1 to a maximum of 16. The coded bits used to represent a sequence of symbols are a variable length string of bits. This bit string must be decoded sequentially in order to reconstruct the original sequence of symbols. As noted above, Huffman coding generates code tables based on symbol occurrence probabilities. The codes generated are minimum redundancy codes. The Huffman coding used by the MPEG-2 Standard is based on a static coding algorithm. The coding procedure used by Huffman Coding is lossless coding, because the exact sequence of symbols encoded is recovered by the decoding process.

The Inverse Quantizer 321 receives run/level (run/amplitude) coded symbols from the VLC unit 311 and outputs a block of 64 coefficients that are sent to the Inverse Discrete Cosine Transform Unit 331. The Inverse Quantizer 321 converts the run/level coded symbols to zeros and symbols, unzigs the data, handles differential pulse code modulation (DPCM) decoding for the Discrete Cosine coefficients, and dequantizes the data.

FIG. 2 shows the zig-zag scanning order of the Discrete Cosine Transform coefficients. The top left coefficient is the DC coefficient. All other coefficients are considered as AC terms. The numbers indicate the order in which the coefficients are read for run length and level coding.

The process after run length coding is to "unzig" the data. This means placing the "level" data in the correct positions relative to an 8 by 8 block or matrix. The "run" identifies the number of skipped positions, i.e., zeros. The levels also need to be further processed under quantization.

In quantization, that is, in encoding, the level is divided by a number called the "quantization factor" to become a quantized coefficient. Quantization and dequantization introduce some degree of loss into the decoded data. In the decoding process, the unzigged quantized coefficient ("level") will be multiplied by the quantization factor to produce a dequantized coefficient. The quantization factor is used by the decoder to decode the datastream, and is part of incoming datastream to the decoder. This coefficient, a frequency domain value, will go to the Inverse Discrete Cosine Transform unit 331 to be transformed back to a time domain based signal.

Intra blocks, also known as I-Pictures or as I-frames, contain DC coefficients that are Differential Pulse Code Modulation coded. This means that the DC value of the previous value predicts the current 8 by 8 block DC value. The quantized difference is then coded. The Differential Pulse Code Modulation coding for the DC coefficient is applicable for all three components, i.e., the Y component, the Cb component, and the Cr component. After Differential Pulse Code Modulation decoding, the DC coefficients of the 8 by 8 block will go through the inverse quantization process before being sent to the Inverse Discrete Cosine Transform unit 331.

After a block of signals have been dequantized in the Dequantizer unit 321 the Inverse Discrete Cosine Transform unit 331 performs a two dimensional inverse discrete cosine transform on the 8 by 8 block to form a reconstructed image block. The reconstructed image block is added to the predicted block from the Motion Compensation Unit 341 if required. The Inverse Discrete Cosine Transform Unit 331 and the Motion Compensation Unit 341 synchronize their outputs during this summation step. The summation results are then sent to the memory 601 for output to display and for reference.

The Motion Compensation Unit 341 receives commands and address from the controller 401 and performs the required interpolations to form predicted image blocks. The predicted output block is synchronized to the output of the Inverse Discrete Cosine Transform and added to the output of the Inverse Discrete Cosine Transform reconstructed block by this summation step.

Motion compensation exploits the temporal redundancy in video pictures by coding the difference between a current block and a block in a previous picture or in a future picture. Motion means the pels will be in a different location in the current picture than in the reference picture. This displacement is given by motion vectors. These motion vectors and the coded difference between the current and the future picture construct the motion compensated picture.

Motion compensation includes prediction from past, or future, or both past and future pictures, utilizing motion pels of full pel or half pel accuracy. Motion compensation is carried out in both interlaced and non-interlaced video data streams.

Figure 6:
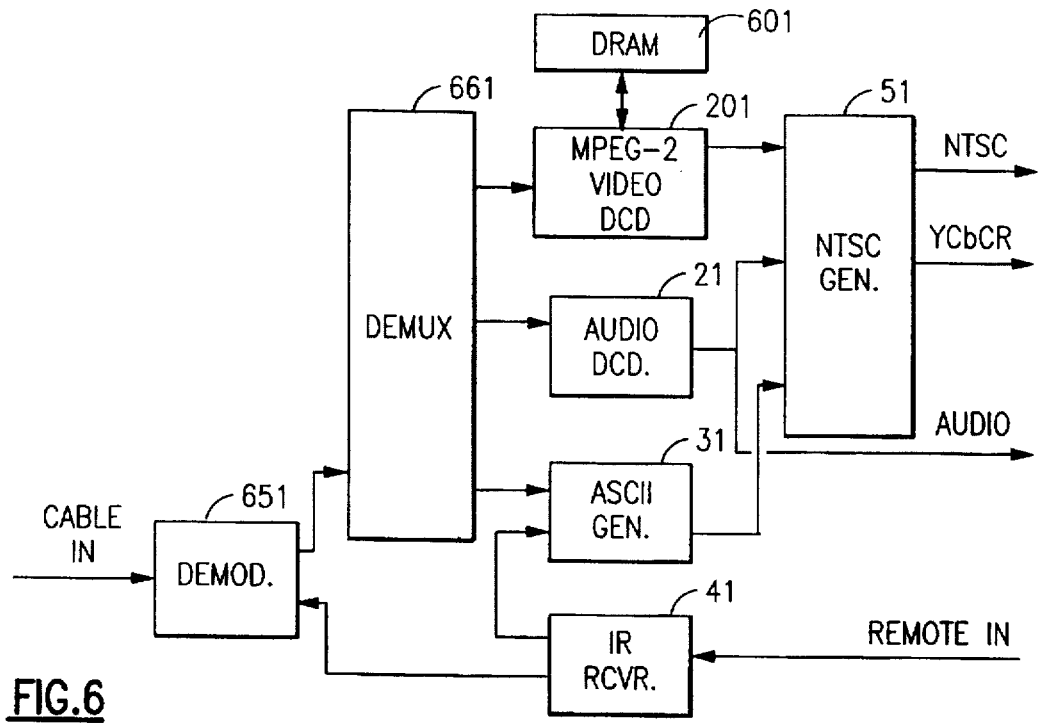
FIG. 6 is a block diagram of the decoder of the invention in a dedicated or television set top box environment.

The decoder system of the invention is shown in a dedicated, digital entertainment terminal environment in FIG. 6. The system receives input from the cable or upstream broadcasting means 651. This is demultiplexed into video, audio, and ASCII portions in demultiplexer 661. The system includes the video decoder 11 of the invention, an audio decoder 21, an ASCII Generator 31, and an Infrared Receiver 41. The ASCII Generator 31, the Audio Decoder 41, and the Video Decoder 11 provide outputs through the NTSC (National Television Standards Committee) generator 51.

Personal Computer Environment

In a personal computer, workstation, or other computation environment the compressed video data input comes from either a storage device or a network communications adapter. The video data is typically handled as a packet transfer across a system I/O bus. This means that the system of the invention must be capable of receiving bursts of data at high rates for a limited time, and then allow other devices to use the system I/O bus while the encoded data is being processed. This is accomplished through the use of the internal FIFO buffer 241 which must be large enough to handle such data bursts. In a computation environment the decompressed video data stream is provided on the display (Pixel Bus) Interface, which can directly interface to a video controller. Alternatively, the video data stream can be sent on a high bandwidth system bus to a graphics processor frame buffer.

Figure 7:
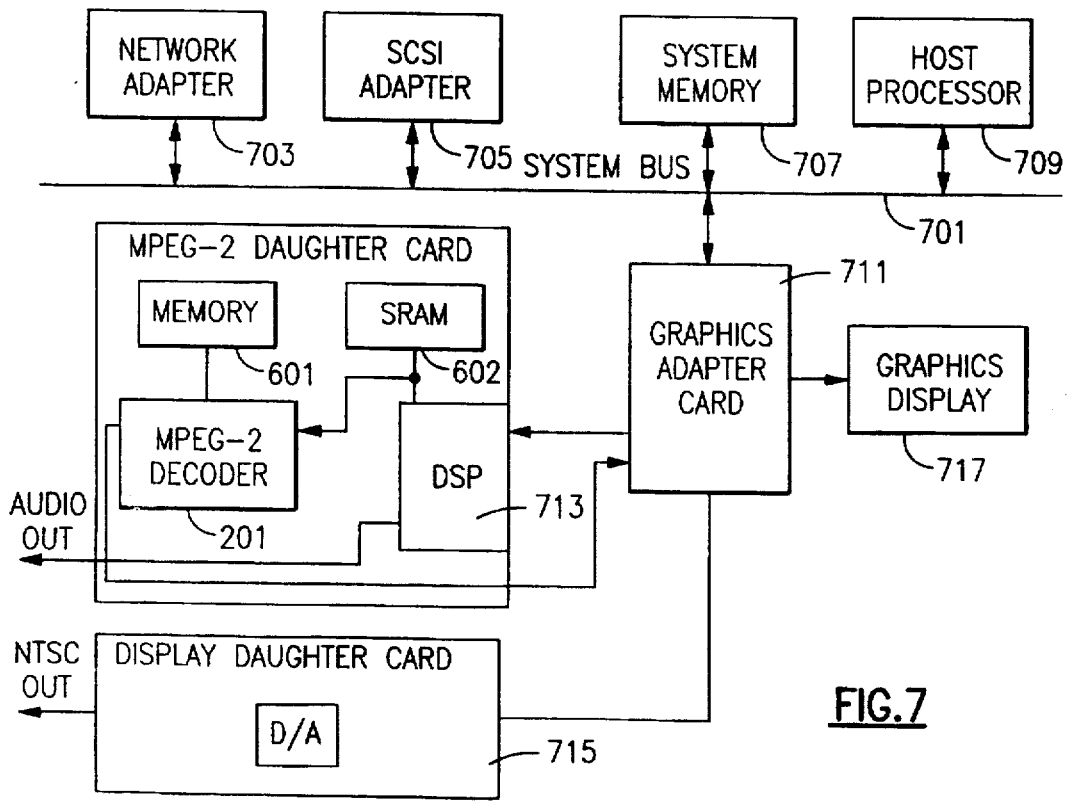
FIG. 7 is a block diagram of the decoder of the invention in a personal computer environment.

A typical PC system environment is shown in FIG. 7. The FIGURE shows the system bus 701, with various system bus subsystems, e.g., a network adapter 703, a SCSI adapter 705, a system memory 707, and a host processor 709. The system of the invention is connected to the system bus 701 through a graphics adapter card 711 and includes a digital signal processor 713, the decoder 201 of the invention, DRAM 601, and SRAM 602 The Graphics Adapter Card 711 provides interface to an optional Display Daughter Card 715, to a Graphics Display 717, or to both.

Processor I/O

The system has three external interfaces, a host interface 202, a display interface 208, and a memory interface 221, 223, 225.

The host interface 202 is the primary control and compressed data interface. This interface 202, a 16 bit slave interface, provides host processor, i.e., transmission network, access to the internal registers, local storage, and functional units of the system. The Host Interface 202 functions as the command, status, and encoded data interface for the system. High level systems commands and status are passed between the decoder system of the invention and the host system through this host interface 202.

Poly Phase FIR Aspect Ratio Expansion

Horizontal expansion to fit different display aspect ratios starts with operations on the chrominance difference signals. The chrominance difference signals are usually subsampled from the original image prior to the MPEG2 encoding. The chrominance sampling format is specified according to the following:

4:2:0 chrominance difference signals are subsampled in one half the resolution of the luminance in both the vertical dimension and horizontal dimension as shown in FIG. 8;

4:2:2 chrominance difference signals are subsampled in one half the resolution of the luminance in the horizontal dimension only as shown in FIG. 9;

4:4:4 there is an equal number of luminance samples and chrominance difference samples.

For MPEG2 main level, main profile, the compressed data consists of 4:2:0 chrominance. Most MPEG2 decoders output the decompressed video in 4:2:2 format. This is represented in FIG. 8 and FIG. 9. The horizontal positioning of the chrominance samples shown in FIG. 10 is co-located with the luminance samples for MPEG2. A co-located sample is made by taking the same number of samples of chrominance as luminance pixels, but then decimating every other sample.

In MPEG1, the chrominance samples are located "half-way" between the adjacent luminance samples as shown in FIG. 11, which shows the horizontal position of MPEG1 chrominance signals.

The process of re-sizing is accomplished using a digital FIR (Finite Impulse Response) filter. The process treats the luminance (Y) and each color difference signal (U,V) independently and the same convolution sum is applied to each set of samples to form a new line of digital data.

The digital filter uses several distinct phases to control more accurately how the chrominance samples are placed spatially during expansion, with respect to the luminance samples. This is employed in most of the poly-phase filters expansion modes (aspect ratios). The poly-phase filter takes MPEG2 input chrominance samples that are placed spatially as shown in FIG. 10 and delivers the 4:2:2 expanded resulting chrominance samples placed spatially in the more accurate form as shown in FIG. 11.

The MPEG2 Pan and Scan feature requires that the original image be offset at sub-pel locations. Although the MPEG2 syntax allows for ¹⁄₁₆th pel accuracy, in practice, ¼ pel is sufficient to show a smooth panning motion at any rate of pan. The Pan and Scan feature employs a 3:4 expansion filter.

FIG. 12 shows the phase relationship between the luminance and chrominance for various sub-pel positions in the 3:4 expansion filter. The starting sub-pel position is indicated on the left by a fraction starting at 0.00 for starting dead center on the first even luminance y(0) and at intervals of 0.25 for each incremental position change, ending with 1.75. The series ends in a modulo eight fashion when the starting pixel is shifted to the next even luminance sample, y(2). This can be extended for other accuracies, for example, ⅛ pel accuracy or greater, with FIG. 12 showing ¼ pel accuracy.

The implementation of this 3:4 expansion filter uses four distinct phases to control more accurately how the chrominance samples are placed prior to expansion, with respect to the luminance samples. Thus the proper initialization of the same phase control allows the filter to accurately place both the expanded luminance samples and chrominance samples in the accurate form down to 0.25 sub-pel resolution.

Using FIG. 12 as reference, an example would be to limit the filter to initialize with the pel offset at 0.00 (even pel, full pel) for all cases. Then the most accurate choice for the chroma phase would be 3.

In the design of digital display functions, an important factor is compactness and accuracy of the circuitry for processing Finite Impulse Response (FIR) horizontal expansion. These designs herein combine the hardware for several different horizontal expansion ratios into a single unit.

Figures 13, 13A:
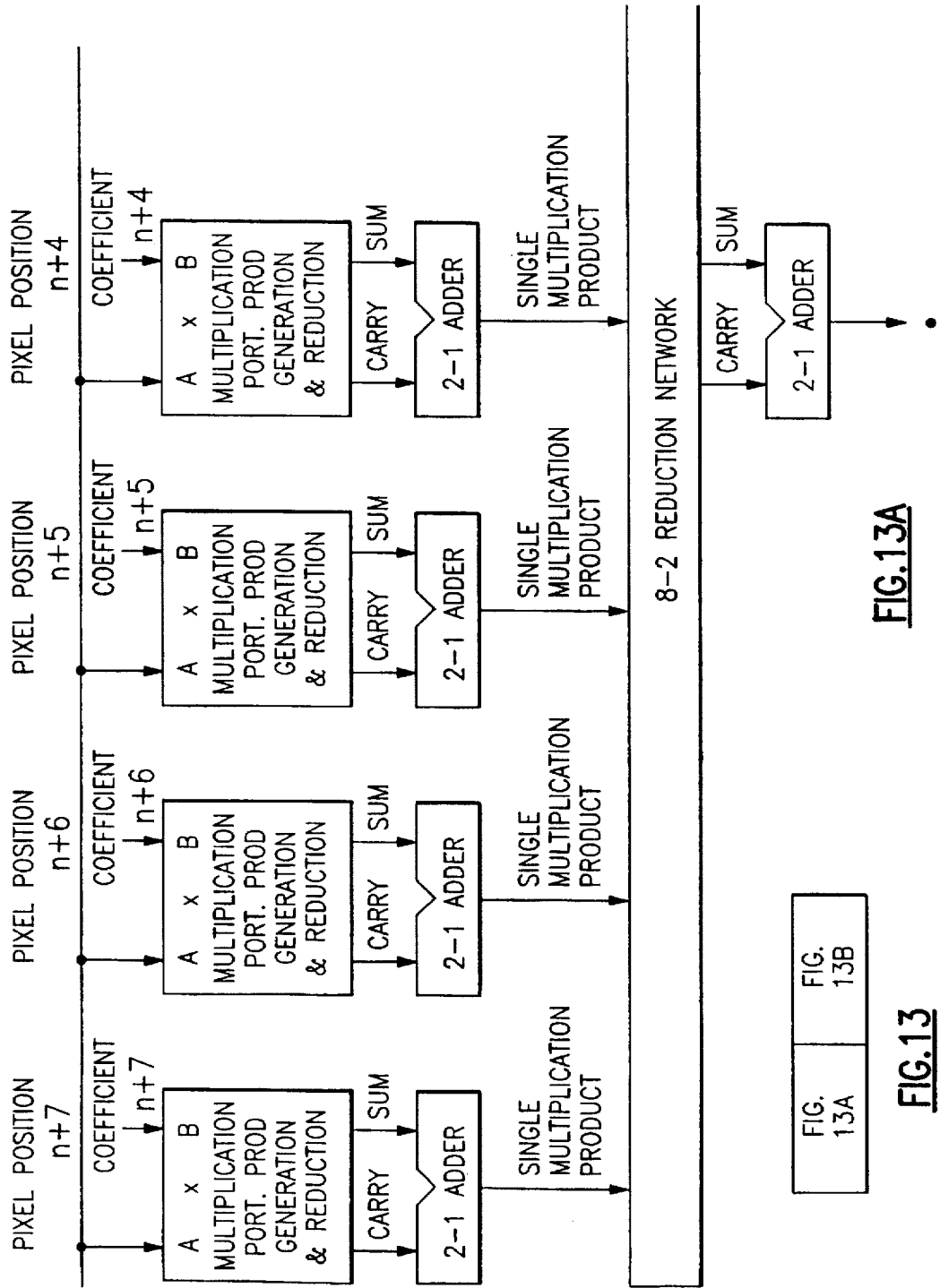
FIG. 13 shows a general horizontal expansion unit according to the invention.
Figure 13B:
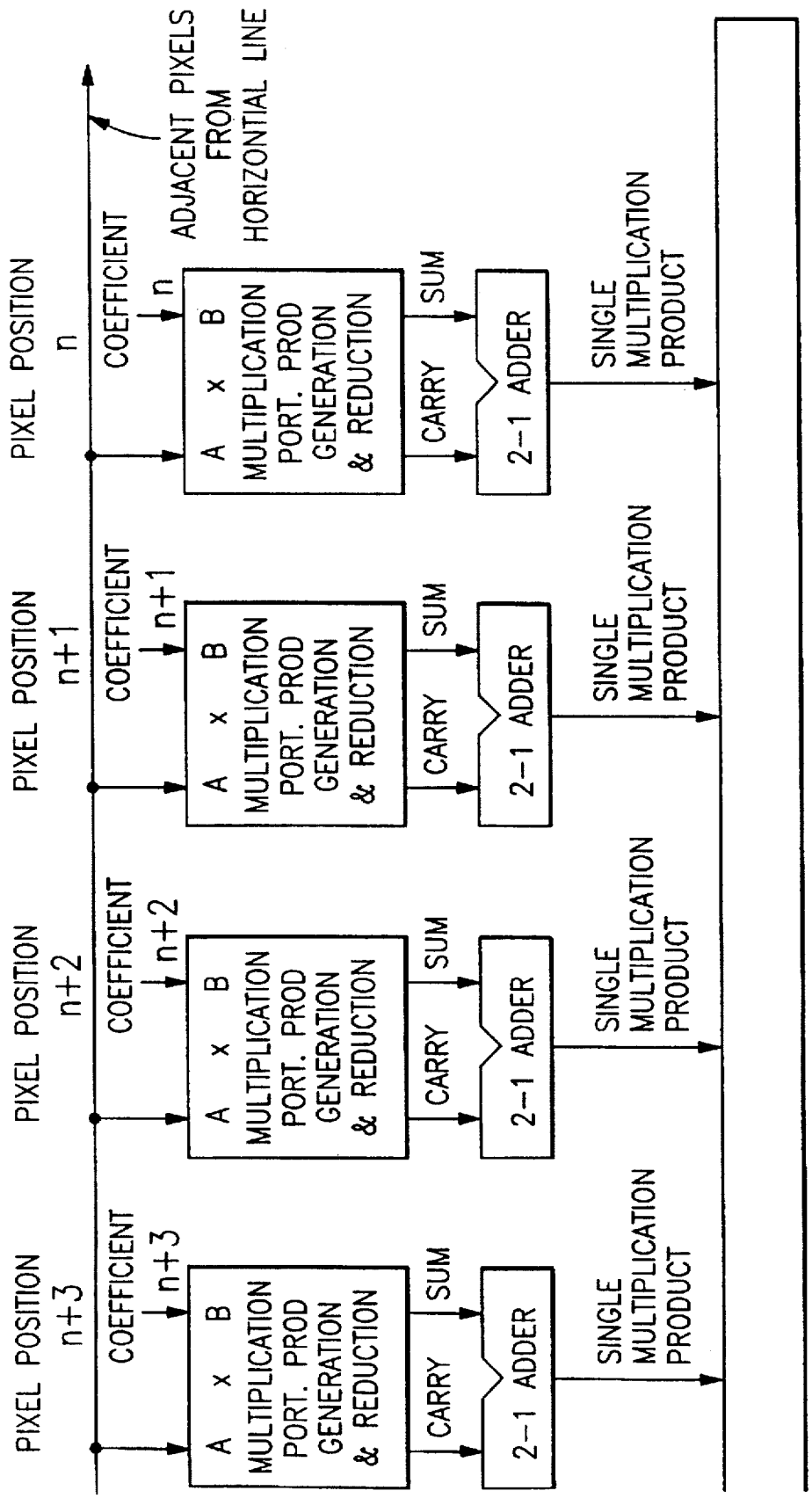

The design of such combined units is such that the multiplications involved in the FIR transform are performed in parallel, and then the results are accumulated to the accuracy appropriate to the that of the input to horizontal expansion unit. Such a design is depicted in FIG. 13. Recently, these designs have employed eight multipliers to create a new convoluted pixel of appropriate accuracy.

The rate at which the resulting data is required to be fed into the actual display unit in order to comply with CCIR Recommendation 601 creates a burden to the goal of compactness of the design. This high rate of data requires that the horizontal display unit be cycled at such a high frequency as to exceed the latency of the above unit. Thus, pipeline registers would need to be added to the design to break it into multiple cycles.

Figures 14, 14A:
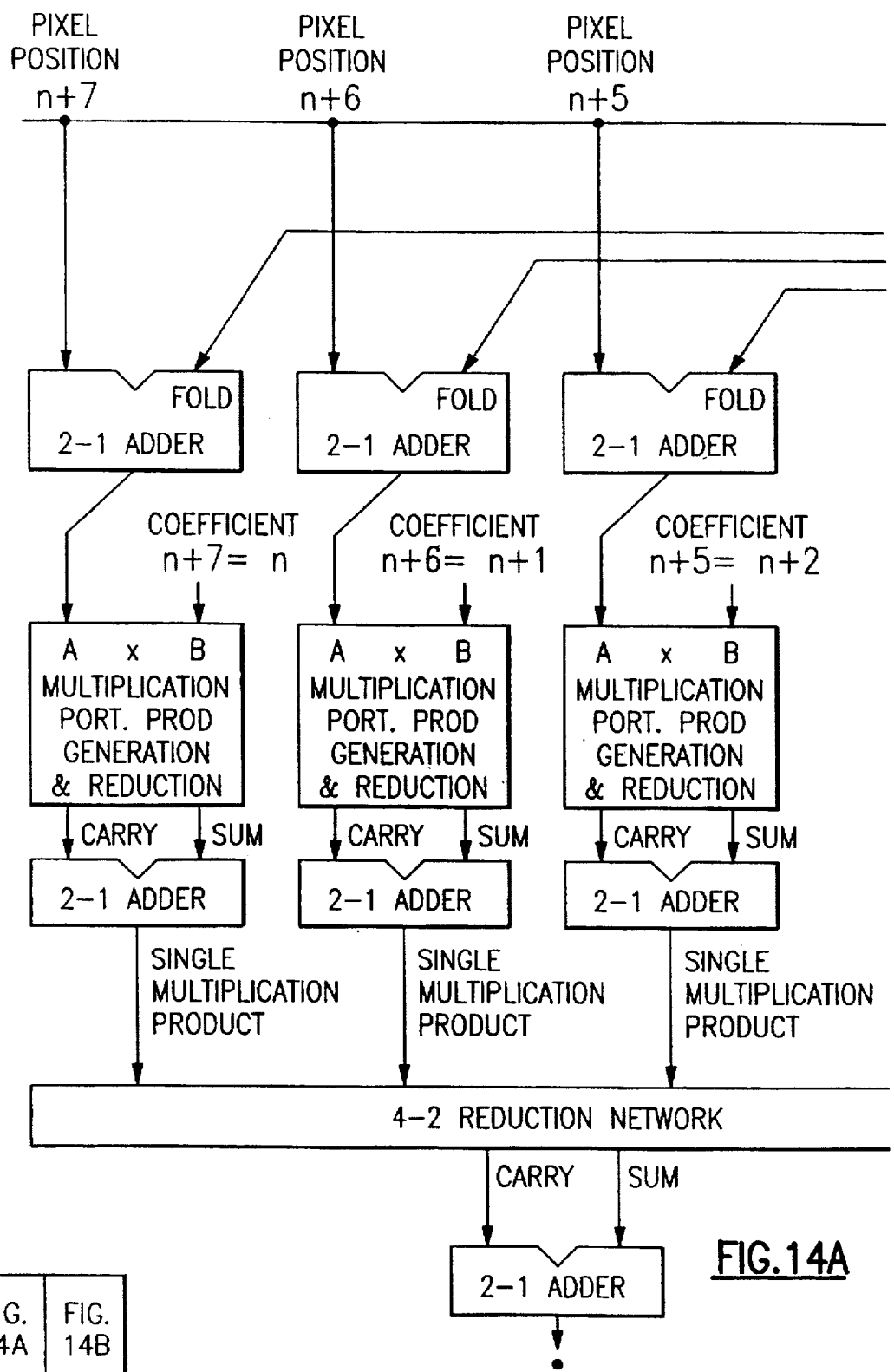
FIG. 14 shows a general horizontal expansion unit according to the invention.
Figure 14B:
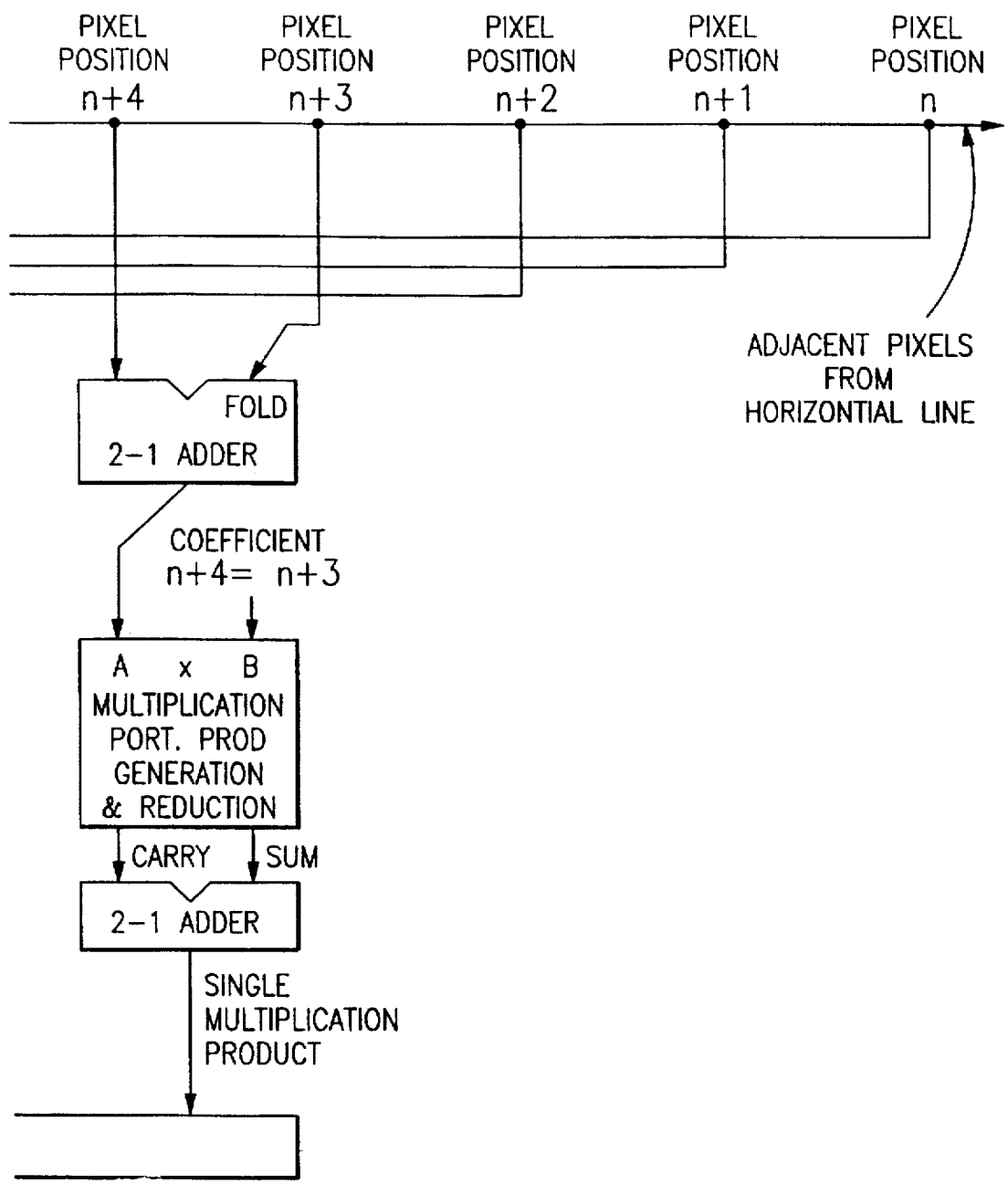

Also, if the transfer function coefficients can be selected to be symmetric around a known point, then the above network can be "folded" to reduce the number of multipliers to four by the insertion of an addition step above the multiplications. This step to reduce area does increase the need for pipeline registers to achieve the required cycle item, and now design tradeoffs of register and adder area versus multiplier area must be considered. Use of serially designed (no carry-look-ahead) adders would make inclusion of this folding step more beneficial to the goal of design compactness at risk of yet greater latency. This folded circuit is depicted in FIG. 14.

One aspect of this invention is to reduce the latency of this network in order to reduce the need for larger numbers of pipeline registers, and achieve an overall compactness.

Figure 15:
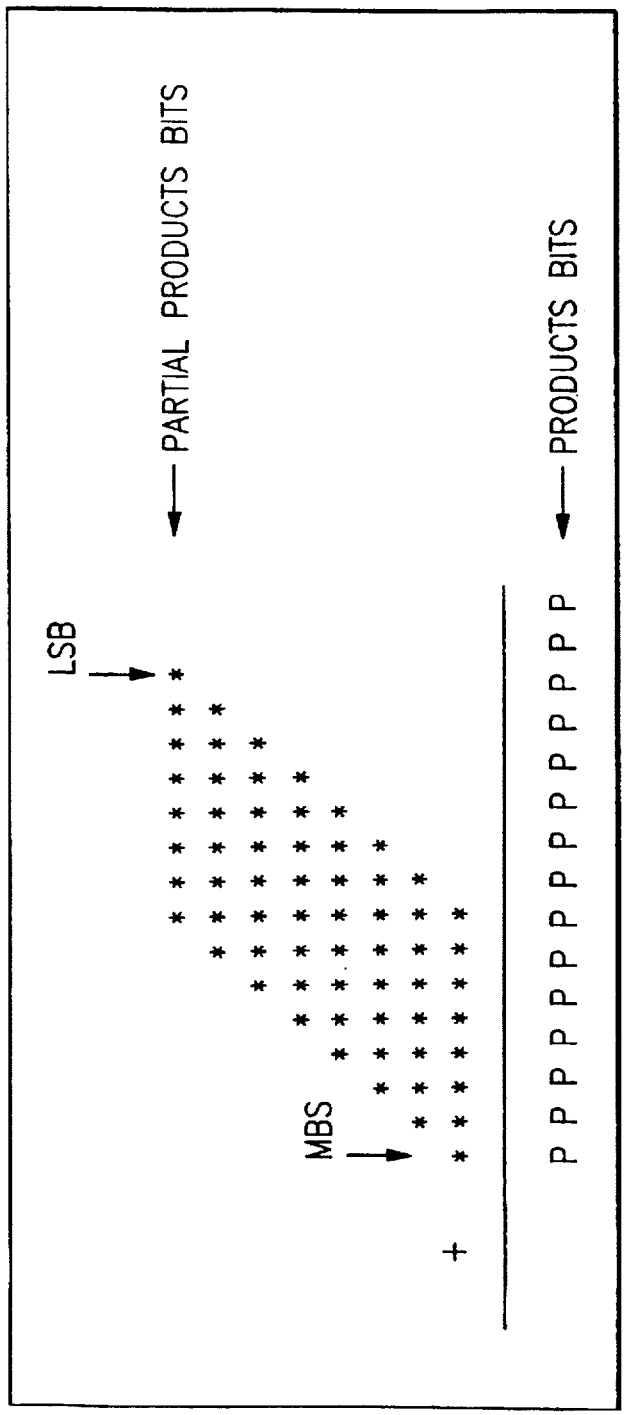
FIG. 15 shows a general multiplier.

Any multiplication, no matter how it is implemented, involves the generation of partial products by treating one of the operands as a multiplier, and the other as a multiplicand, and thus the partial products are arranged in the well known fashion as shown in FIG. 15. These partial products must be summed to form the product, using any of the known methods, such as Wallace trees, or addition arrays, either of which may be composed of carry-save adders or multi-bit counters. The number of bits contained in the data input is approximately equal to the maximum number of bits needed to define the coefficients, and thus is shown that way.

Figure 17A:
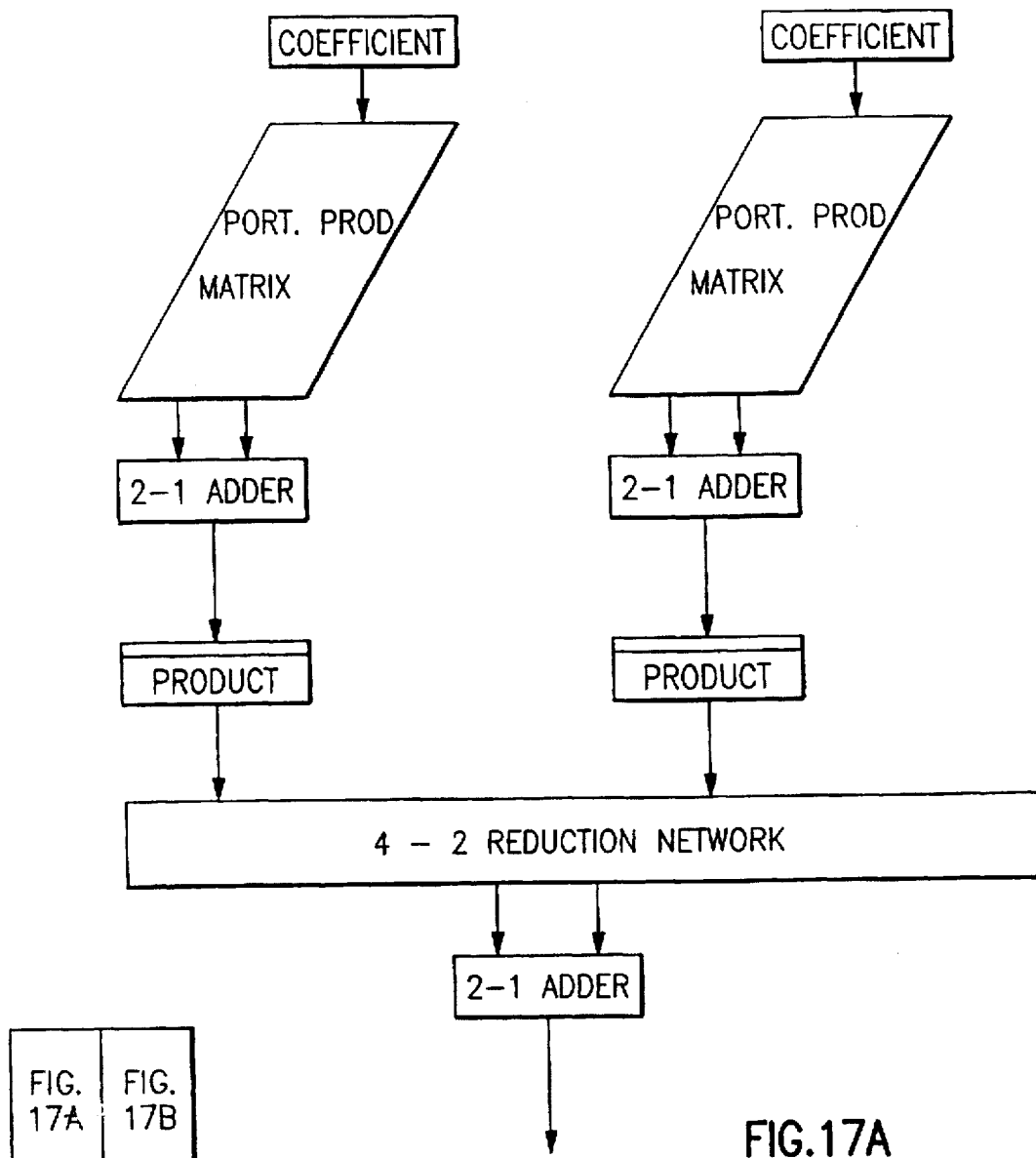
FIG. 17 shows a folding adder feeding a multiplier port.
Figure 17:
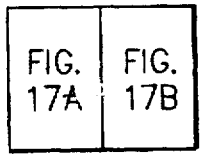
Figure 17B:
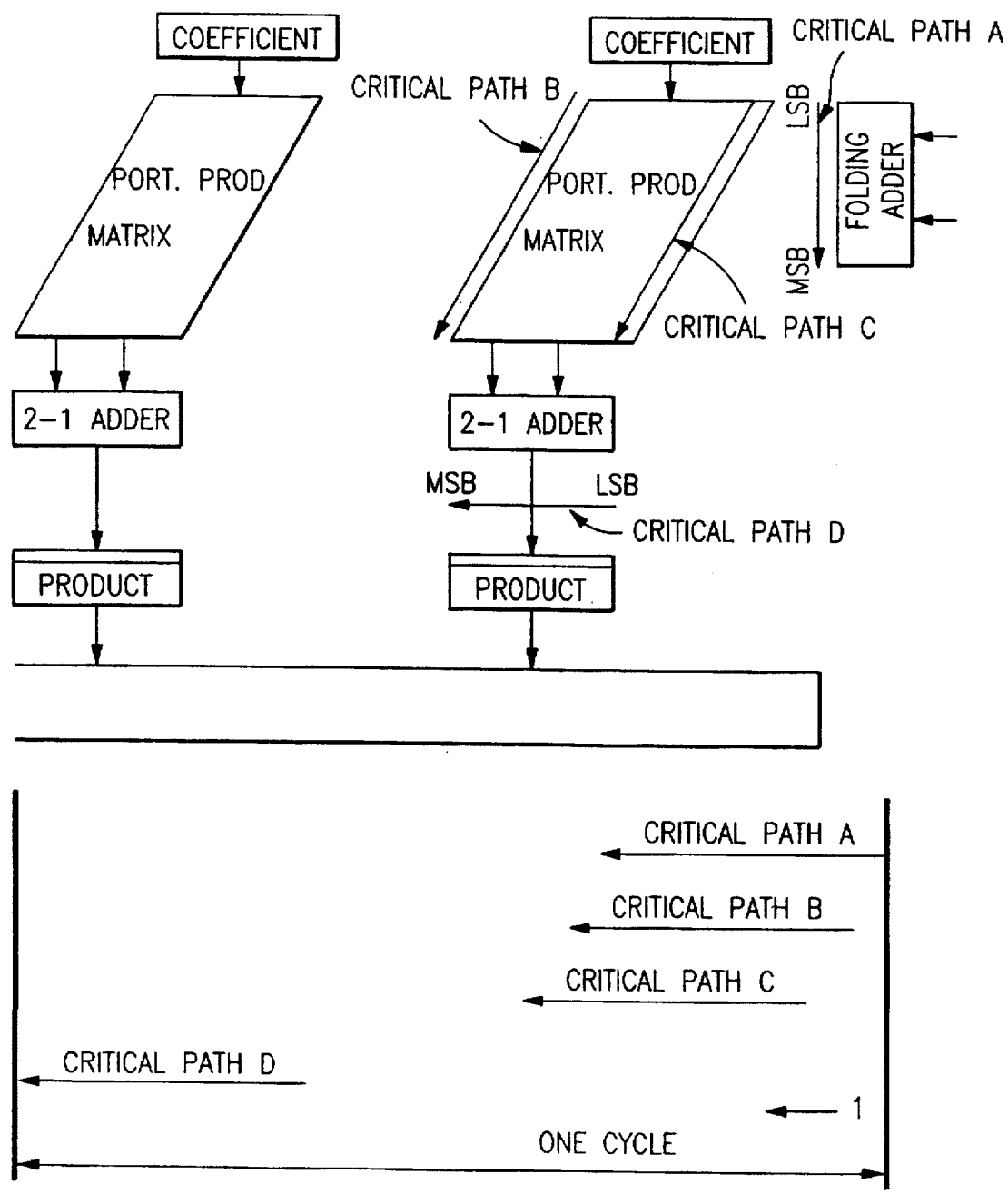

The data for the coefficient is assumed to be readily available. The output of the folding serial adder may be fed into either the multiplicand or multiplier input. The two possibilities are shown in FIG. 16 and FIG. 17. The two Figures demonstrate that the best choice is to feed the output of the folding serial adder into the multiplier input.

In FIG. 16 it should be noted that any attempt at encoding the coefficient to reduce the number of partial products, for example, employing some version of Booths algorithm, would reduce the latency for critical path B, at the expense of increased area required to store the coded coefficient. Given that the display unit may be required to perform several different aspect ratio transformations, several sets of coefficients may need to be stored.

Note that wave-front of calculation for the creation and accumulation of the partial products follows closely behind the wave-front for the production of the folding adder sum.

The circuits in FIG. 16 and FIG. 17 compute the explicit product for each of the four multiplications, which then feed an accumulation network where the four products eventually reduce down to a combined value which represents the new pixel. Here the most likely point for the insertion of a pipeline register is to latch up the four products, or the most significant portions of the products and portions of the 4-2 network whose computation has concluded by the end of the cycle. The second cycle, used to complete the 4-1 reduction, is easily completed in one cycle.

What is needed is to eliminate one of the segments of the critical path to reduce the latency. The network shown in FIG. 18 reduces this latency.

Figure 18:
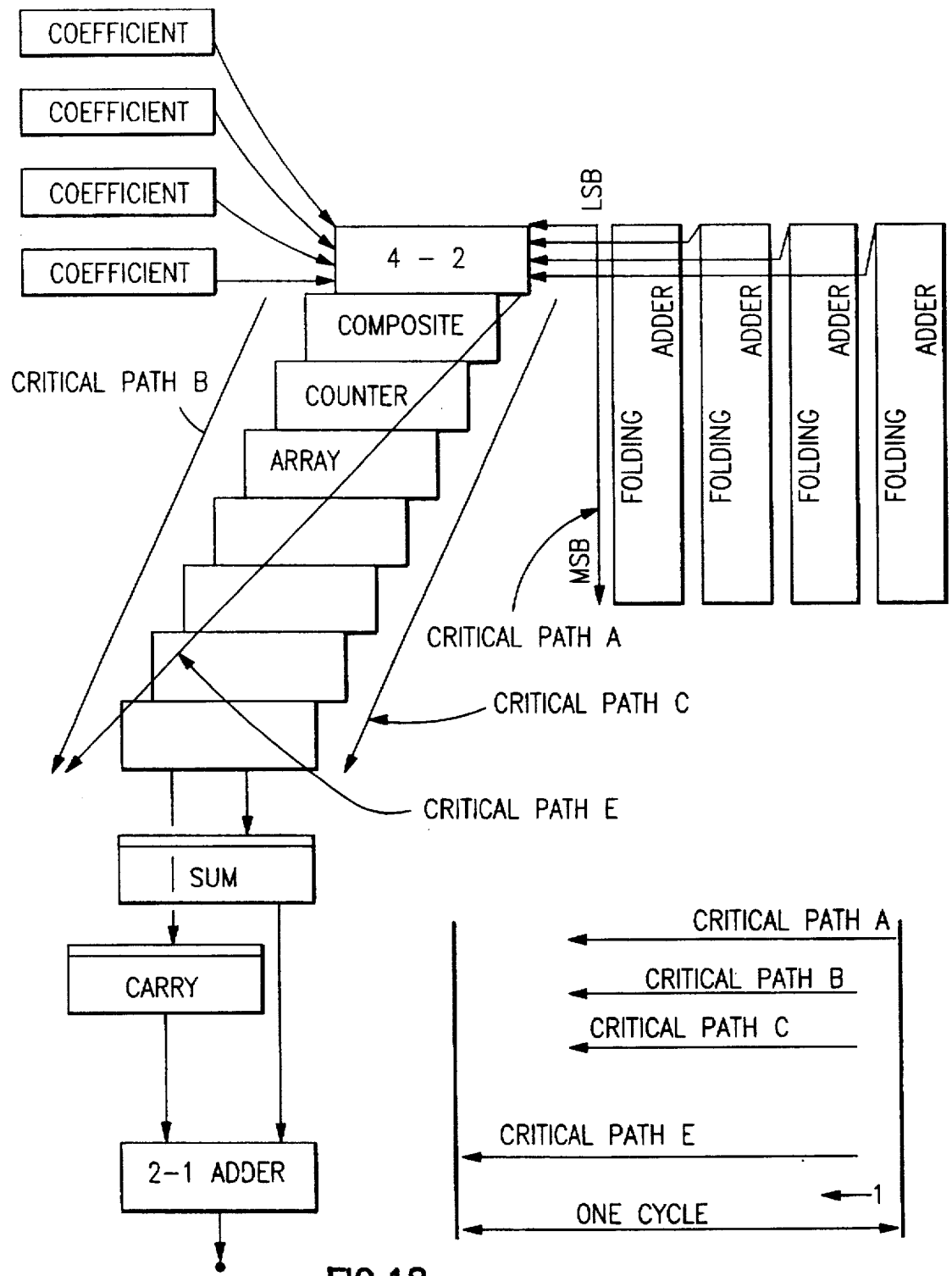
FIG. 18 shows a folding adder feeding a multiplier port with all partial products being summed in one network.

The network shown in FIG. 18 does not compute the explicit product for each of the four multiplications. Instead the network combines individual partial products from all four multiplications. The network employs a composite 4-2 counter arranged in an array configuration. Each of the four multiplications contribute one partial product that is used for the pre-addition portion of the composite 4-2 counter.

The critical path characteristics are very similar to that of the network shown in FIG. 17. The wave-front of the folding adder proceeds first. After the first two LSBs of the folding adder are created, and the associated partial products are present in the 4-2 matrix, the transmission portion of the 4-2 counter array is ready to proceed. The delay through the folding adder is slightly faster than the critical delay path through the 4-2 counter array, and thus the wave-front for the creation of the partial products for the pre-addition portion of the composite 4-2 counter stays slightly ahead of the wave-front for the transmission portion of the 4-2 counter array. By the time the folding adder has computed the MSB, and the most significant partial product is installed in the matrix, the matrix need only complete the computation of the last few rows. The latency for the 2-1 adder (critical Path D) is essentially eliminated. The latency for Critical Path E is only slightly longer than Critical Path B or C, because this single network is now reducing 4 times as many partial products. Furthermore, because all four multiplications have participated in this computation, the least significant product bits may be discarded. Thus a convenient point to insert a pipeline register is to latch the sum and the carry produced b the network. This uses only a pair of registers, instead of the four registers needed for the previous schemes.

While the invention has been described with respect to certain preferred embodiments and exemplifications, it is not intended to limit the scope of the invention, but solely by the claims appended hereto.

We claim:

1. In a digital video decoder comprising a data buffer, a variable length decoder, a dequantizer, an inverse discrete cosine transform decoder, a motion compensator, a polyphase finite impulse response horizontal digital filter having four folded parallel multiplier units with an adder above the multiplier for display output processing, a display unit video output, and a controller the improvement wherein each of the folded parallel multiplier units with an adder thereabove comprises a folding serial adder with the output of the folding serial adder going to the multiplier input of the multiplier unit and wherein said decoder further includes 4-2 counters arranged in an array configuration wherein each of the four multipliers contributes one partial product for the pre-addition portion of the 4-2 counter.

2. The digital video decoder of claim 1 having multiple phases to control placing of chrominance samples with respect to luminance samples.

3. A method of decoding a digital video data stream having luminance and chrominance samples in a decoder to obtain an output video display comprising receiving the data stream in a buffer of the decoder, variable length decoding the data stream, dequantizing the decoded data stream, inverse discrete cosine transforming the dequantized data stream, motion compensating the inverse discrete cosine transformed data stream, and carrying out convolution multiplications in 4-tuple parallel with 4-2 counters through a folding serial adder preceding the multiplications to create a convolution sum of pixels of the motion compensated data stream to expand the output video display.

4. The method of claim 3 comprising initializing the decoder wherein a starting phase of the chrominance samples for MPEG2 data streams are such that the chrominance samples are accurately placed with respect to luminance samples corresponding thereto.

* * * * *